US007845001B2

(12) United States Patent
Knowles et al.

(10) Patent No.: US 7,845,001 B2
(45) Date of Patent: Nov. 30, 2010

(54) METHOD AND SYSTEM FOR MANAGING SECURE PLATFORM ADMINISTRATION

(75) Inventors: Christopher L. Knowles, Willow Springs, NC (US); James R. Mosier, Apex, NC (US); Robin J. Fegley, Apex, NC (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1841 days.

(21) Appl. No.: 10/940,619

(22) Filed: Sep. 15, 2004

(65) Prior Publication Data

US 2006/0059543 A1    Mar. 16, 2006

(51) Int. Cl.
*G06F 7/04*    (2006.01)

(52) U.S. Cl. .................... 726/4; 726/2; 726/3; 726/21; 713/168; 713/170

(58) Field of Classification Search ............ None
See application file for complete search history.

(56) References Cited

U.S. PATENT DOCUMENTS

| 7,356,694 | B2 * | 4/2008 | Mayo et al. ............ 713/159 |
| 7,376,581 | B2 * | 5/2008 | DeRose et al. .......... 705/14 |
| 2002/0082922 | A1 * | 6/2002 | Van Zoest et al. ....... 705/14 |
| 2007/0198713 | A1 * | 8/2007 | Tsao et al. ............. 709/225 |

* cited by examiner

*Primary Examiner*—Pramila Parthasarathy

(57) ABSTRACT

A method, a system and a server are provided for managing networks in a multiple domain environment is provided. A user request may be received via a first secure session. A domain pertaining to the user request may be automatically determined by accessing a database. A request, based on the user request, is generated and sent to a device of the determined domain.

30 Claims, 11 Drawing Sheets

600  Choose Element(s) WAITING for ats

| | | | | |
|---|---|---|---|---|
| Request Type: Add Site | | | | |
| Customer: ats | | | | |
| Required Add Elements: 10.10.10.103  ATS_c2500-r3.r3-RH  10.10.10.103  ATS_c2500-r3.r3-RH-Cpu-1 | | | ALIAS | |

| ADD | IP ELEMENT | SPEED IN | SPEED OUT | ALIAS |
|---|---|---|---|---|
| ☐ | Select All | | | |
| ☐ | 10.10.10.103 ATS_c2500-r3.r3-Ethernet0 | | | |
| ☐ | 10.10.10.103 ATS_c2500-r3.r3-Serial0  /— 602 | | | |
| ☑ | 10.10.10.103 ATS_c2500-r3.r3-Serial0-dlci-302 | | | |
| ☐ | 10.10.10.103 ATS_c2500-r3.r3-Serial0-dlci-304 | | | |
| ☐ | 10.10.10.103 ATS_c2500-r3.r3-Serial0-dlci-305 | | | |
| ☐ | 10.10.10.103 ATS_c2500-r3.r3-Serial0-dlci-306 | | | |
| ☐ | 10.10.10.103 ATS_c2500-r3.r3-Serial0-dlci-308 | | | |

606 —— ☑ CONTINUE    ✖ CANCEL —— 604

FIG. 6

700  Choose Site(s) to Process for ats

| | | |
|---|---|---|
| Request Type: Delete Site | | |
| Customer: ats | | |

| SELECT | NODE | IP |
|---|---|---|
| 702 —☐ | ats-7200 | 10.10.10.30 |
| ☐ | ats-c2500-r3 | 10.10.10.103 |
| ☐ | ats-c2500-r5 | 10.10.10.105 |

800    Choose Site(s) to Process for ats

| Request Type: Delete Element | | |
|---|---|---|
| Customer:    ats | | |
| SELECT | NODE | IP |
| 802 ☐ | ats-7200 | 10.10.10.30 |
| ☐ | ats-c2500-r3 | 10.10.10.103 |
| ☐ | ats-c2500-r5 | 10.10.10.105 |

900    Choose Elements to Process for ats

| Request Type: Delete Element | |
|---|---|
| Customer:    ats | |
| NODE | 10.10.10.103 |
| ELEMENT | |
| 902 ☐ ATS_c2500-r3.r3-Serial0 | |
| ☐ ATS_c2500-r3.r3-Serial0-dlci-302 | |

1000 Choose Site(s) to Process for ats

| | | |
|---|---|---|
| Request Type: Modify Site IP | | |
| Customer: ats | | |
| SELECT | NODE | IP |
| 1002 ☐ | ats-7200 | 10.10.10.30 |
| ☐ | ats-c2500-r3 | 10.10.10.103 |
| ☐ | ats-c2500-r5 | 10.10.10.105 |

1100 Enter New IP Address(s) to Process for ats

| | |
|---|---|
| Request Type: Modify Site IP | |
| Customer: ats | |
| NODE | 10.10.10.103 |
| NEW IP | 10.10.10.103  — 1102 |
| ELEMENTS | |
| ATS_c2500-r3.r3-RH | |
| ATS_c2500-r3.r3-RH-Cpu-1 | |
| ATS_c2500-r3.r3-Serial0 | |
| ATS_c2500-r3.r3-Serial0-dlci-302 | |

1200 Choose Site(s) to Process for ats

| | Request Type: Modify Element | |
|---|---|---|
| | Customer: ats | |
| SELECT | NODE | IP |
| 1202 ☐ | ats-7200 | 10.10.10.30 |
| ☐ | ats-c2500-r3 | 10.10.10.103 |
| ☐ | ats-c2500-r5 | 10.10.10.105 |

1300 Choose Elements to Process for ats

| Request Type: Modify Element | | | | |
|---|---|---|---|---|
| Customer: ats | | | | |
| NODE | 10.10.10.103 | 1304 | 1306 | 1308 |
| SELECT | ELEMENT | SPEED IN | SPEED OUT | ALIAS |
| 1302 ☐ | ATS_c2500-r3.r3-Serial0 | 56000 | 56000 | here_there |
| ☐ | ATS_c2500-r3.r3-Serial0-dlci-302 | 16000 | 16000 | here_there |

Element(s) Spreadsheet for ats

1500    1502
 ☒ Download Spreadsheet

| ELEMENT | IP ADDRESS | SPEED IN | SPEED OUT |
|---|---|---|---|
| ATS_c2500-r3.r3-RH | 10.10.10.103 | 0 | 0 |
| ATS_c2500-r3.r3-RH-Cpu-1 | 10.10.10.103 | 0 | 0 |
| ATS_c2500-r3.r3-Serial0 | 10.10.10.103 | 56000 | 56000 |
| ATS_c2500-r3.r3-Serial0-dlci-302 | 10.10.10.103 | 16000 | 16000 |
| ATS_c2500-r5-BRI0 | 10.10.10.105 | 40000 | 40000 |
| ATS_c2500-r5-BRI0:1 | 10.10.10.105 | 20000 | 20000 |
| ATS_c2500-r5-BRI0:2 | 10.10.10.105 | 30000 | 30000 |
| ATS_c2500-r5-Ethernet0 | 10.10.10.105 | | |
| ATS_c2500-r5-RH | 10.10.10.105 | 0 | 0 |
| ATS_c2500-r5-RH-Cpu-1 | 10.10.10.105 | 0 | 0 |
| ATS_c2500-r5-Serial0 | 10.10.10.105 | | |
| ATS_c2500-r5-Serial0-dlci-502 | 10.10.10.105 | | |
| ATS_c2500-r5-Serial0-dlci-503 | 10.10.10.105 | | |
| ATS_c2500-r5-Serial0-dlci-504 | 10.10.10.105 | | |
| ATS_c2500-r5-Serial0-dlci-506 | 10.10.10.105 | | |
| ATS_c2500-r5-Serial0-dlci-508 | 10.10.10.105 | | |
| ATS_c2500-r5-Virtual-Access1 | 10.10.10.105 | | |

FIG. 15

METHOD AND SYSTEM FOR MANAGING SECURE PLATFORM ADMINISTRATION

TECHNICAL FIELD

Systems and methods consistent with the principles of the invention relate generally to network administration and, more particularly, to network administration in a multiple domain environment.

BACKGROUND OF THE INVENTION

To manage an existing multiple domain environment, network management servers are deployed in each domain. In existing multiple domain environments, administration is not centralized and an administrative account is established on each network management server in each domain. Before a provisioning request can be processed, the correct domain must be known. Therefore, a user may look up the domain name in a database before making the provisioning request to a network management server in the proper domain. Once the proper domain is known, a user, such as a support staff member, may log into an administrative account on the network management server and make the provisioning request.

In existing networks, the user interface for network management is typically a manual data entry interface, which provides a user with many opportunities to mistype information. As a result, a user who manually enters a mistyped provisioning request may be notified that the request is rejected and may have to reenter the request. This can be a very repetitive and frustrating task for a user.

SUMMARY OF THE INVENTION

In a first aspect, a method for managing networks in a multiple domain environment is provided. A user request is received via a first secure session. A domain pertaining to the user request is automatically determined by securely accessing a database. A request, based on the user request, is generated and sent to a device associated with the determined domain.

In a second aspect, a system for managing networks in multiple domains is provided. The system includes a first server in a domain, a user device and a second server. The second server is configured to receive a user request from the user device via a first secure session over a network, automatically determine a domain for the user request, generate a request based on the user request, send the request to the first server via the network, receive request results from the first server via the network, and provide the request results to the user device via the network.

In a third aspect, a server for use in a network is provided. The server includes at least one processor and a storage device configured to store instructions for the at least one processor. When the at least one processor executes the instructions, the at least one processor is configured to receive a user request from a user device, automatically access a database to determine a domain for the user request, generate a request based on the user request, send the generated request to a device in the determined domain via a network, receive results of the request from the device, and inform a user of the results.

In a fourth aspect, a machine-readable medium is provided. The machine-readable medium contains instructions for controlling at least one processor to perform a method for managing networks in a multiple domain environment. The method includes receiving a user request from a user device, automatically accessing a database to determine a domain for the user request, generating a request based on the user request, sending the generated request to a device in the determined domain via the network, receiving results of the request from the device, and informing a user of the results.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 5-15 illustrate exemplary displays that may be displayed in implementations consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Exemplary System for Managing Secure Platform Administration

Figure 1:
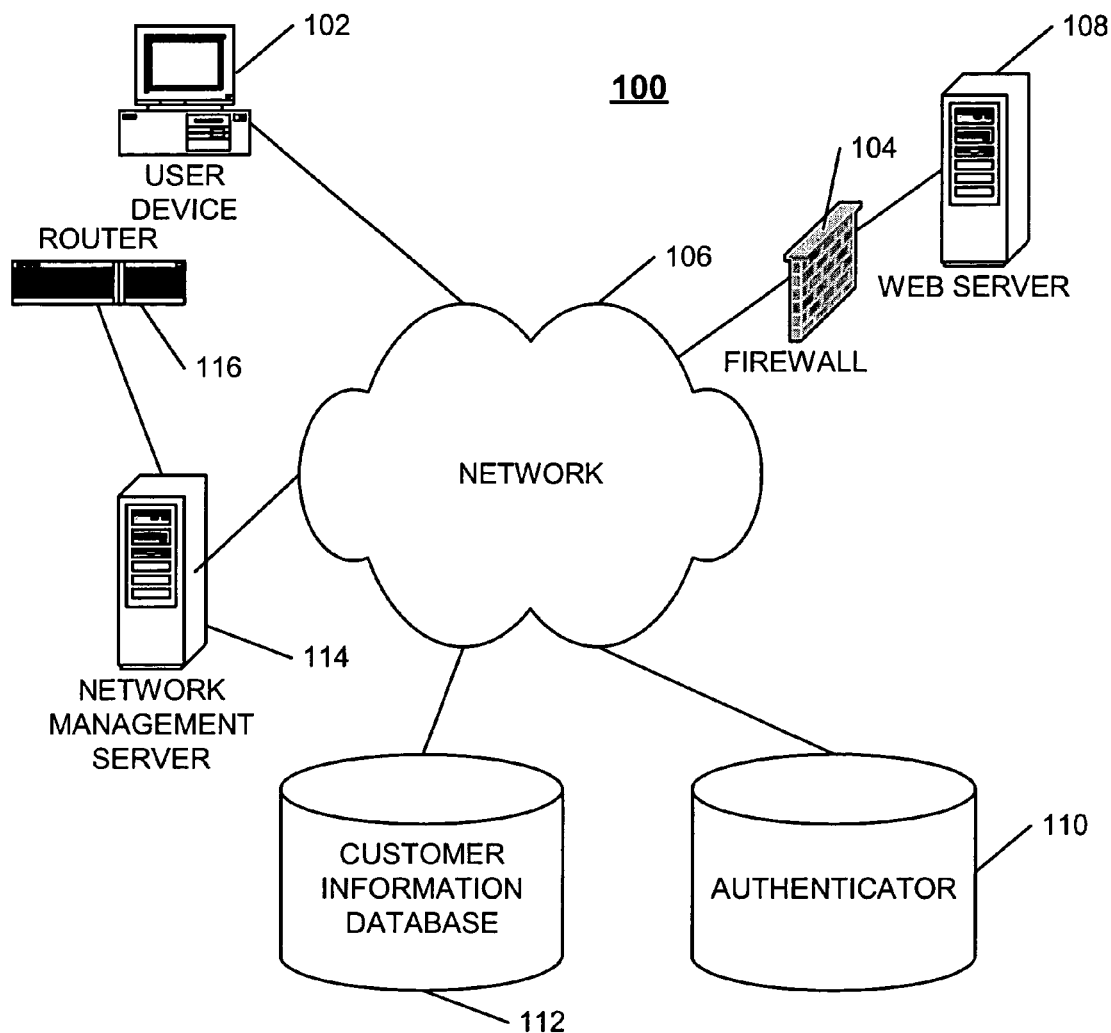
FIG. 1 illustrates an exemplary system for securely managing platform administration consistent with principles of the invention.

FIG. 1 illustrates an exemplary system 100 in which system and methods consistent with the principles of the invention may be implemented. System 100 may include a user device 102, a firewall 104, a network 106, a web server 108, an authenticator 110, a customer information database 112, a network management server 114 and a router 116.

User device 102 may be a processing device, such as a personal computer (PC) or a handheld processing device. In some implementations, user device 102 may execute web browser software for communicating with web server 108 via network 106. Network 106 may include, for example, a local area network, a wide area network, or a network of various networks, such as the Internet. Firewall 104 may be any conventional firewall for preventing unauthorized devices from accessing web server 108. Web server 108 may be accessed by user device 102 via network 106 and firewall 104. Access to network management server 114 may be controlled via web server 108. Authenticator 110 may be a commercial off-the-shelf (COTS) user authentication and access application such as, for example, SITEMINDER®, by Netegrity of Waltham, Mass. Authenticator 110 may execute on a network server (not shown) and may authenticate a user via a user ID/password, entered by the user, and an access list. Via authenticator 110, users may receive no access, partial access, or complete access. Customer information database 112 may reside on a dedicated server with secure connections and may include information, such as customer contact information, device information, Internet Protocol (IP) addresses, and passwords. Network management server 114 may be a server executing COTS network management server software, such as, for example, eHealth Suite, available from Concord Communications of Marlboro, Mass. Router 116 may be a conventional network router.

FIG. 1 illustrates an exemplary system. System 100 may have more or fewer components than shown in FIG. 1. For example, system 100 may have several network management servers 114, each representing a different domain. In addition, in alternative implementations, the functions performed by one or more of the devices shown in FIG. 1, and described in more detail below, may be performed by another device.

Figure 2:
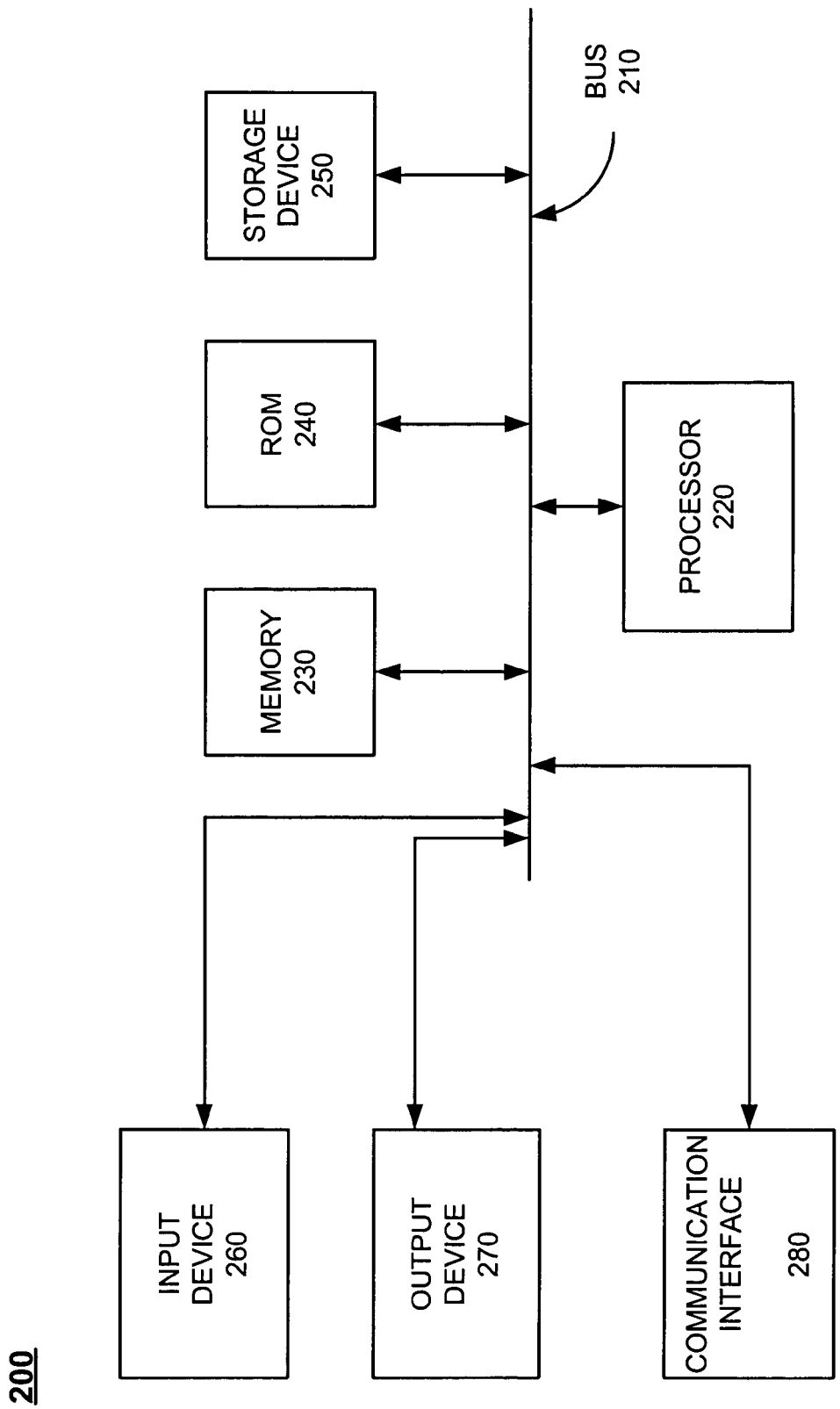
FIG. 2 illustrates a processing device that may be used to implement a user device, a web server, a network management server, a server for a customer information database or an authenticator of the system of FIG. 1.

FIG. 2 is a functional block diagram that illustrates a processing device 200 that may be used to implement user device 102, web server 108, network management server 114 or servers for customer information database 112 and authenticator 110. Device 200 may include a bus 210, a processor 220, a memory 230, a read only memory (ROM) 240, a storage device 250, an input device 260, an output device 270, and a communication interface 280. Bus 210 may permit communication among the components of device 200.

Processor 220 may include one or more conventional processors or microprocessors that interpret and execute instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of magnetic or optical recording medium and its corresponding drive, such as a magnetic disk or optical disk and its corresponding disk drive.

Input device 260 may include mechanisms that permit a user to input information to system 200, such as a keyboard, a mouse, a pen, a biometric mechanism, such as a voice recognition device, etc. Output device 270 may include mechanisms that output information to the user, including a display, a printer, one or more speakers, etc. Communication interface 280 may include any transceiver-like mechanism that enables device 200 to communicate via a network. For example, communication interface 280 may include a modem or an Ethernet interface for communicating via network 106. Alternatively, communication interface 280 may include other mechanisms for communicating with other networked devices and/or systems via wired, wireless or optical connections.

Device 200 may perform functions in response to processor 220 executing sequences of instructions contained in a computer-readable medium, such as memory 230. A computer-readable medium may include one or more memory devices and/or carrier waves. Such instructions may be read into memory 230 from another computer-readable medium, such as storage device 250, or from a separate device via communication interface 280.

Execution of the sequences of instructions contained in memory 230 may cause processor 220 to perform certain acts that will be described hereafter. In alternative implementations, hard-wired circuitry may be used in place of or in combination with software instructions to implement the present invention. Thus, the present invention is not limited to any specific combination of hardware circuitry and software.

Exemplary System Process

Figure 3:
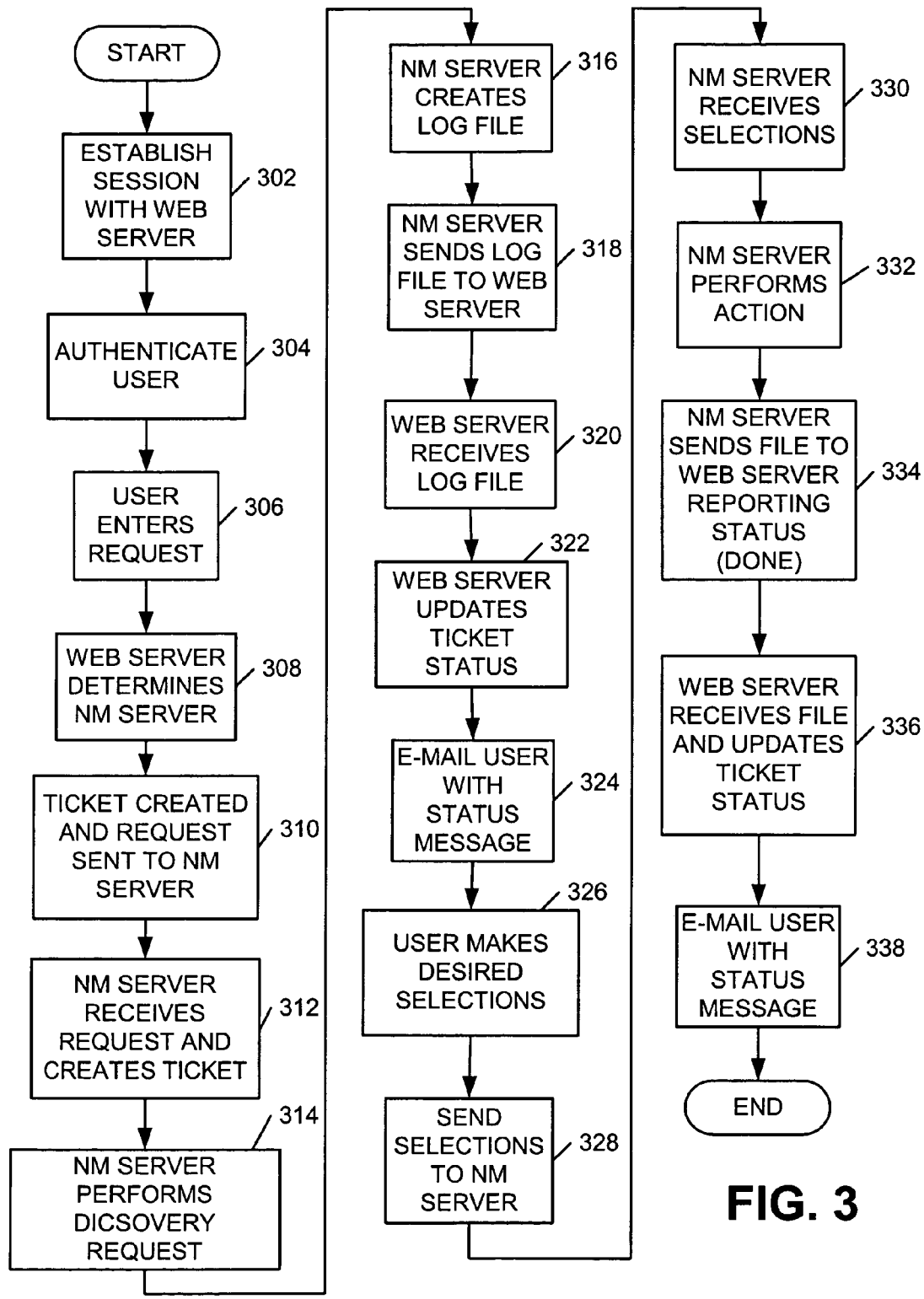
FIG. 3 is a flowchart that illustrates exemplary processing of a request.

FIG. 3 is a flowchart that helps illustrate exemplary processing in system 100, consistent with the principles of the invention, for processing a typical command. The process may begin with a user establishing a session with web server 108 from user device 102 via network 106 (act 302). User device 102 may be executing a web browser application. The session may be a secure session that uses a protocol, such as, for example, Secure Socket Layer (SSL), which uses a private key to encrypt data transferred over the SSL session. When establishing the session, the user may enter identifying information, such as, for example, a user ID and a password.

Web server 108 may establish a secure session with authenticator 110 via a secure protocol, such as, for example, SSL. Web server 108 may send information identifying the user, such as the user ID and password to authenticator 110. Authenticator 110 may then authenticate the user and may access a policy server access list to determine what type of access, if any, the user should be permitted (act 304). Authenticator 110 may return an indication of authentication and access, such as, for example, a token, to web server 108, which may send an indication to user device 102 that access has or has not been granted.

Assuming that authenticator 110 has granted access to the user, the user may enter a request via user device 102 (act 306), such as, for example, a provisioning request. This may be done in a number of different ways. For example, in one implementation consistent with the principles of the invention, the user may select an item from a pull-down menu indicating the type of request. Examples of requests will be discussed in more detail below.

The user may also select a customer and provides information for the request. The request and associated information may be sent to web server 108 via the secure session. Web server 108 may receive the request from user device 102 and may automatically query customer information database 112 to determine on which domain network management (NM) server 114, pertaining to the request, resides (act 308). That is, a number of network management servers 114 may exist, with each server 114 being associated with one or more customer's networks. In one implementation consistent with the principles of the invention, web server 108 may determine the domain by querying customer information database 112 via a secure shell (SSH), which is a program that logs into another processing device via a network, executes commands on the other processing device and moves files from one processing device to another.

Once web server 108 determines the domain for servicing the user's request, web server 108 may create a ticket for tracking progress of the request and may send the request to network management server 114 in the proper domain (act 310).

A ticket number may have a format such as, <year><month><date><number sequence>. Web server 108 may increment the number sequence each time a ticket is created. In other implementations consistent with the invention, web server 108 may create a ticket having a different format.

Figure 4:
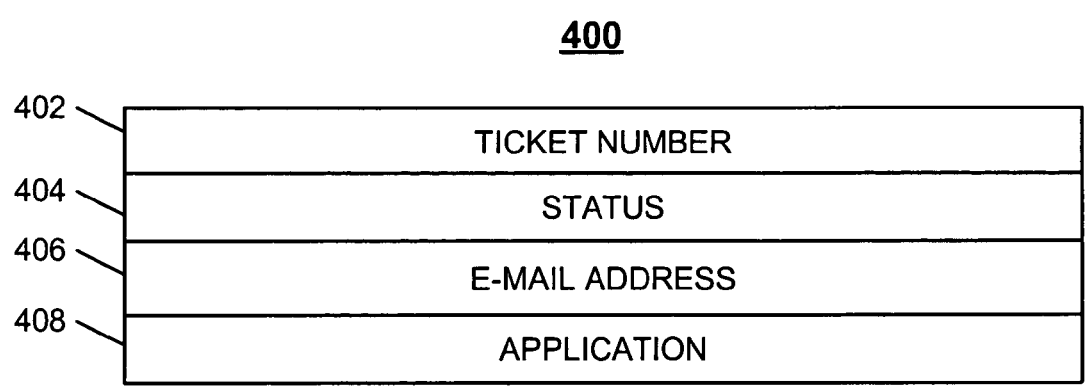
FIG. 4 illustrates an exemplary format of a ticket for keeping track of progress associated with performing a request.

Web server 108 may maintain a database having a number of tickets. FIG. 4 illustrates an exemplary format for ticket 400. Ticket 400 may include a ticket number 402, a status 404, an e-mail address 406 and an application 408.

Ticket number 402 may have a format, such as <year><month><date><number sequence>, discussed above. Status 404 may indicate the status of the request corresponding to the ticket. In one implementation, status 404 may include failed, pending, waiting, updating and completed. E-mail address 406 is an e-mail address to which web server 108 may send e-mail messages and application 408 is the application associated with the ticket.

Returning back to FIG. 3, when web server 108 sends the request to network management server 114, at act 310, web server 108 may update status 404, associated with the ticket, to pending. Network management server 114 may receive the request and may perform a discovery operation to discover devices connected to router 116 that are associated with network management server 114 (act 314). During the discovery operation, network management server 114 may query router 116 to determine what elements are being managed. For example, if the user request is an "add site" request, network management server 114 may "discover" all elements associated with one or more IPs entered by the user by sending a query to router 116. If some of the discovered items are already managed by network management server 114, network management server 114 may provide information indicating which discovered items are already managed. Network management server 114 may create a log file with the discovered results (act 316) and may securely send the log file to web server 108 (act 318).

Web server 108 may receive the log file from network management server 114 and may store the information from the log file for later viewing by the user (act 320). Web server 108 may then update the status of the ticket (act 322). For example, the status 404 may be updated from pending to waiting. Web server 108 may then e-mail a status message to user device 102 (act 324). The status message may include the current status and a link, which the user can select to display information, such as discovery information. Once the information is displayed via user device 102, the user may make desired selections, associated with the user request, based on the displayed information (act 326). Web server 108 may then change status 404 to updating and may send a file with desired selection information to network management server 114 via the secure connection (act 328).

Network management server 114 may receive the desired selection information from web server 108 (act 330) and may perform the requested action (act 332). Network management server 114 may create a log of the actions taken and results of the actions, may securely send the log file to web server 108, and may indicate that the requested action(s) are completed via the log file (act 334).

Web server 108 may receive and save the log file and update status 404 from updating to completed (act 336). Web server 108 may then send an e-mail message to the address indicated in e-mail address 406 of ticket 400 (act 338). The e-mail message may include the current status and may contain a link, which the user may select, to view information from the saved log file on web server 108.

Alternatively, in some implementations, web server 108 may send display information to user device 102 for displaying instead of first sending an e-mail to the user with a link to displayable information.

FIG. 3 illustrates processing of an exemplary request. It should be understood that processing variations may occur based on the particular request and the particular system.

Interserver Communication

In one implementation consistent with the principles of the invention, web server 108 and network management server 114 may each include at least one "mover" process and at least one "shaker" process. Each mover process may execute about every two minutes on network management server 114 and about every minute on web server 108. Each shaker process may run about every two minutes on network management server 114 and every minute on web server 108. Other time intervals for executing these processes may be used in other implementations of network management server 114 and web server 108 consistent with the principles of the invention.

Each mover process may check for a file to move by checking a specific directory for a specific file type. A file of the specific file type on web server 108 may indicate information to move and a particular network management server 114, which is to receive the file. A file of the specific type on network management server 114 may include information to move to web server 108. When the file is found in the specific directory, the server (e.g., 108 or 114) may send the file to the destination server in an authenticated, secure manner via network 106. As previously mentioned, the sending server may use SSH to send the file to the destination server.

Each shaker process on network management server 114 and web server 108 may scan a specific directory for a particular file type. When the particular file type is found, the process may read the file and may perform a set of tasks associated with the file.

Exemplary File Extensions

In one implementation consistent with the principles of the invention, web server 108 and network management server 114 may use file extensions, such as: DSC (Discovery), DCI (Database Configuration Information), RES (Results), PND (Pending), UPD (Update), PALOG (Poller Audit Log) and DILOG (Discover Interactive Log). A file with a DSC extension may be generated by web server 108 to initiate discovery when received by network management server 114. A file with a DCI extension is a database configuration information file that may be generated by network management server 114 to perform database configuration updates. A file with a RES extension is a results file that may be generated by network management server 114 when performing a discovery process. A file with a PND extension is a pending file that may be generated by a network management server 114 shaker script. A file with a UPD extension may be generated by web server 108 to initiate a database update on network management server 114. A file with a PALOG extension is a Poller Audit Log file that may be generated by network management server 114 when performing a database update. When web server 114 receives a PALOG file from network management server 114, it may assume that the request is complete. Thus, when web server 108 receives a PALOG file, web server 108 may treat this event as a completion trigger and may change the ticket status to complete and notify the user via e-mail of the completion. A file with a DILOG extension is a Discover Interactive Log, which may be generated by network management server 114 when a database update is performed based on discovery results.

Exemplary Operation

As discussed above, a user may log into web server 108 via user device 102 by entering, for example, a user ID and password, via an application, such as, for example, a web browser. Web server 108 may send the user ID and password to authenticator 110, via a secure connection, such as an SSH connection, and may receive a token indicating a type of access allowed for this user. If access is allowed, web server 108 may then present to the user, via user device 102, pull down menus for request type and customer name.

Examples of request types may include, Add (add new site, add customer), Delete (delete site, delete element, delete customer), Modify (modify element, modify site IP), and Other (view ticket, generate spreadsheet). The above request types are exemplary and are not meant to be a complete list of all possible request types. In other implementations, other request types may be used.

When a customer is selected via user device 102, assuming the user is authorized to view information pertaining to the selected customer, web server 108 may present a screen, via user device 102, of available sites with selection boxes for the user to select the sites to be modified. When the user selects the sites, web server 108 may present a screen, via user device 102, of all available elements managed for the selected sites and fields that may be modified. The displayed elements may have selection boxes so that the user may indicate which elements are to be modified. When sites or elements are selected, web server 108 may cause the selected sites or elements to be highlighted to make it easy for the user to see what has been selected. The highlighted portions may be highlighted by a particular color, for example, yellow.

Once the user submits a request, web server 108 may create a ticket number and a ticket for tracking purposes and may cause a message to be provided to the user. The following is an exemplary message that may be provided to the user via e-mail or via a display of user device 102:

TICKET #: 200311050008
Your <REQUEST TYPE> request for Customer:<CUSTOMER NAME> has been sent to Network Management Server <SERVER NAME> for processing. You will receive an e-mail notification confirming your <REQUEST TYPE> to the Network Management Server.

Exemplary Requests

The following exemplary requests assume that the user is logged in and authorized via authenticator 110.

Figure 5:
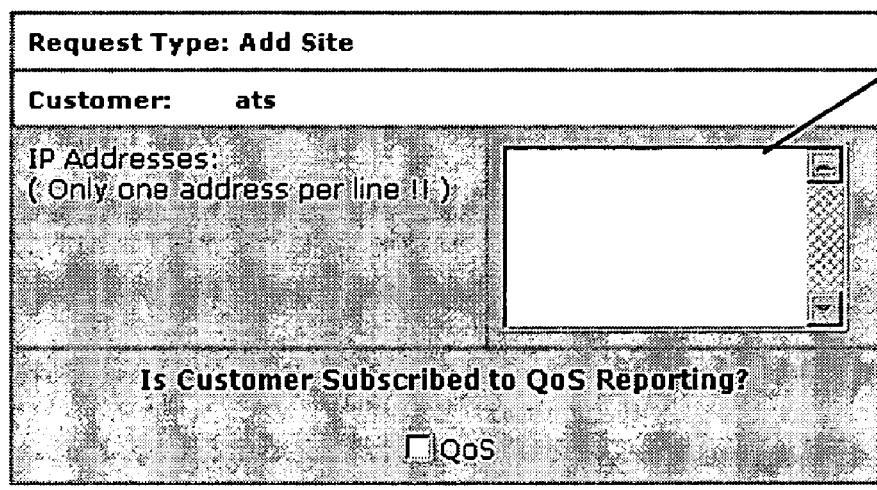

After selecting "Add New Site" from a request pull down menu and a customer, such as, for example, ats, from a pull down menu, web server 108 may cause a screen, such as screen 500, as shown in FIG. 5, to be displayed via user device 102. Screen 500 may include box 502 for entry of one or more IP addresses of sites to be discovered by network management server 114. Web server 108 may be configured such that web server 108 may accept only properly formatted IP addresses entered in box 502.

After entering the one or more IP addresses into box 502, the user may select "Continue" 504. Web server 108 may determine which network management server 114 is to receive the request by accessing customer information database 112, may create ticket 400 for the request, with status 404 set to pending and e-mail address 406 set to the user's e-mail address. Web server 108 may create a file, such as a DSC file, and may securely send the DSC file, to network management server 114 via a mover process to initiate discovery at network management server 114. Network management server 114 may perform a discovery and generate a RES file, which may be sent to web server 108.

Web server 108 may store information from the RES file to a log and may update the ticket status 404 from pending to waiting. Web server 108 may then e-mail a message with a link to the user via e-mail address 406. The user may receive the e-mail indicating that discovery is complete and including a link. When the user selects the link, via user device 102, web server 108 may present output of the discovery to user device 102 from the web server log file. Web server 108 may present a screen, such as screen 600 shown in FIG. 6.

Router health elements for reporting router health, such as router health element 602, may be automatically selected, as shown in FIG. 6. The user may select elements to add and may enter a speed in, a speed out, or an alias for each element. Selecting "Cancel" 604 may cause web server 108 to cancel the request from the system. Selecting "Continue" 606 may cause web server 108 to update status 402 of the current ticket to updating and may generate another request, via a UPD file, to network management server 114 in the proper domain.

Network management server 114 may receive the UPD file and generate a DCI file for performing a database update. When the request is completed, network management server 114 may generate a PALOG file and may send the file to web server 108. Web server 108 may receive the PALOG file and recognize that the PALOG file is a completion trigger. Web server 108 may notify the user, vi an e-mail message, and may update ticket status 404 to completed.

After selecting "Delete Site" from a request pull down menu and a customer, such as, for example, ats, from a pull down menu, web server 108 may determine which network management server 114 is to receive the request by accessing customer information database 112, may create ticket 400 for the request, with status 404 set to pending and e-mail address 406 set to the user's e-mail address. Web server 108 may create a file, such as a DSC file, and may securely send the DSC file, to network management server 114 via a mover process to initiate discovery at network management server 114 of the customer's sites and elements. Network management server 114 may perform the discovery and generate a RES file, which may be sent to web server 108.

Web server 108 may store information from the RES file to a log and may update the ticket status 404 from pending to waiting. Web server 108 may then send an e-mail message to the user with a link for the user to select, such that when the user selects the link from user device 102, web server 108 may send the information from the log file, such that a display 700 (FIG. 7) may appear at user device 102. The user may then select one or more sites for deletion by selecting one or more selection boxes 702 corresponding to the site or sites that the user desires to delete. When the user selects continue 704, web server 108 may generate a UPD file for the requested site deletions and may securely send the UPD file to network management server 114 in the proper domain. Web server 108 may also update status 404 of the current ticket to waiting.

Network management server 114 may receive the UPD file and generate a DCI file for performing a database update. When the request is completed, network management server 114 may generate a PALOG file and may send the file to web server 108. Web server 108 may receive the PALOG file and recognize that the PALOG file is a completion trigger. Web server 108 may notify the user, via an e-mail message, and may update ticket status 404 to completed. In one implementation, web server 108 may cause a warning message to be displayed on user device 102 when "Continue" 704 is selected asking the user to confirm an intention to delete sites.

After selecting "Delete Element" from a request pull down menu and a customer, such as, for example, ats, from a pull down menu, web server 108 may determine which network management server 114 is to receive the request by accessing customer information database 112, may create ticket 400 for the request, with status 404 set to pending and may set e-mail address 406 to the user's e-mail address. Web server 108 may create a file, such as a DSC file, and may securely send the DSC file, to network management server 114 via a mover process to initiate discovery at network management server 114 of the customer's sites and elements. Network management server 114 may perform the discovery and generate a RES file, which may be sent to web server 108.

Web server 108 may store information from the RES file to a log and may update the ticket status 404 from pending to waiting. Web server 108 may then send an e-mail message to the user with a link for the user to select, such that when the user selects the link from user device 102, web server 108 may send at least some of the information from the log file, such that a display 800 (FIG. 8) may appear at user device 102. The user may then select one or more sites having elements to be deleted by selecting one or more selection boxes 802. Web server 108 may then retrieve element information corresponding to the site or sites from the log file and may send the information to user device 102 to be displayed, such as display 900 (FIG. 9). Display 900 may list managed elements at the site or sites selected from display 800. Each listed element of the selected site, in this example, the elements of the site with IP address 10.10.10.103, may be displayed and the display of each listed element may include a selection box 902 to allow the user to indicate which of the elements are to be deleted. The user may select one or more elements for deletion by selecting one or more selection boxes 902. When the user selects continue 904, web server 108 may generate a UPD file for the requested element deletions and may securely send the UPD file to network management server 114 in the proper domain. Web server 108 may also update status 404 of the current ticket to waiting.

Network management server 114 may receive the UPD file and generate a DCI file for performing a database update. When the request is completed, network management server 114 may generate a PALOG file and may send the file to web server 108. Web server 108 may receive the PALOG file and recognize that the PALOG file is a completion trigger. Web server 108 may notify the user, via an e-mail message, and may update ticket status 404 to completed. In one implementation, web server 108 may cause a warning message to be displayed on user device 102 when "Continue" 904 is selected asking the user to confirm an intention to delete elements.

After selecting "Modify Site IP" from a request pull down menu and a customer, such as, for example, ats, from a pull down menu, web server 108 may determine which network management server 114 is to receive the request by accessing customer information database 112, may create ticket 400 for the request, with status 404 set to pending and e-mail address 406 set to the user's e-mail address. Web server 108 may create a file, such as a DSC file, and may securely send the DSC file, to network management server 114 via a mover process to initiate discovery at network management server 114 of the customer's sites and elements. Network management server 114 may perform the discovery and generate a RES file, which may be sent to web server 108.

Web server 108 may store information from the RES file to a log and may update the ticket status 404 from pending to waiting. Web server 108 may then send an e-mail message to the user with a link for the user to select, such that when the user selects the link from user device 102, web server 108 may send the information from the log file, such that a display 1000 (FIG. 10) may appear at user device 102. The user may then select one or more sites for deletion by selecting one or more selection boxes 1002 corresponding to the site or sites that the user desires to delete. When the user selects continue 1004, web server 108 may send information pertaining to the selected site from the log file to cause user device 102 to display information, such as in display 1100. Display 1100 may show the current node address and the elements located at the node. The user may enter, via user device 102, a new IP address in box 1102 and may select continue 1104. Web server 108 may then generate a UPD file for the requested site modifications and may securely send the UPD file to network management server 114 in the proper domain. Web server 108 may also update status 404 of the current ticket to waiting.

Network management server 114 may receive the UPD file and generate a DCI file for performing a database update. When the request is completed, network management server 114 may generate a PALOG file and may send the file to web server 108. Web server 108 may receive the PALOG file and recognize that the PALOG file is a completion trigger. Web server 108 may notify the user, via an e-mail message, and may update ticket status 404 to completed.

After selecting "Modify Element" from a request pull down menu and a customer, such as, for example, ats, from a pull down menu, web server 108 may determine which network management server 114 is to receive the request by accessing customer information database 112, may create ticket 400 for the request, with status 404 set to pending and may set e-mail address 406 to the user's e-mail address. Web server 108 may create a file, such as a DSC file, and may securely send the DSC file, to network management server 114 via a mover process to initiate discovery at network management server 114 of the customer's sites and elements. A shaker process at network management server 114 may initiate the discovery. As a result, network management server 114 may generate a RES file, which network management server 114 may send to web server 108 via a mover process.

Web server 108 may store information from the RES file to a log and may update the ticket status 404 from pending to waiting. Web server 108 may then send an e-mail message to the user with a link for the user to select, such that when the user selects the link from user device 102, web server 108 may send at least some of the information from the log file, such that a display 1200 (FIG. 12) may appear at user device 102. The user may then select one or more sites having elements to be modified by selecting one or more selection boxes 1202. Web server 108 may then retrieve element information corresponding to the site or sites from the log file and may send the information to user device 102 to be displayed, such as display 1300 (FIG. 13). Display 1300 may list managed elements at the site or sites selected from display 1200. Each listed element of the selected site, in this example, the elements of the site with IP address 10.10.10.103, may be displayed and the display of each listed element may include a selection box 1302 to allow the user to indicate which of the elements are to be modified. The user may select one or more elements to be modified by selecting one or more selection boxes 1302. When the user selects continue 1304, web server 108 may generate a UPD file for the requested element modifications and may securely send the UPD file to network management server 114 in the proper domain. Web server 108 may also update status 404 of the current ticket to waiting.

Network management server 114 may receive the UPD file and generate a DCI file for performing a database update. When the request is completed, network management server 114 may generate a PALOG file and may send the file to web server 108. Web server 108 may receive the PALOG file and recognize that the PALOG file is a completion trigger. Web server 108 may notify the user, via an e-mail message, and may update ticket status 404 to completed.

Figure 14:
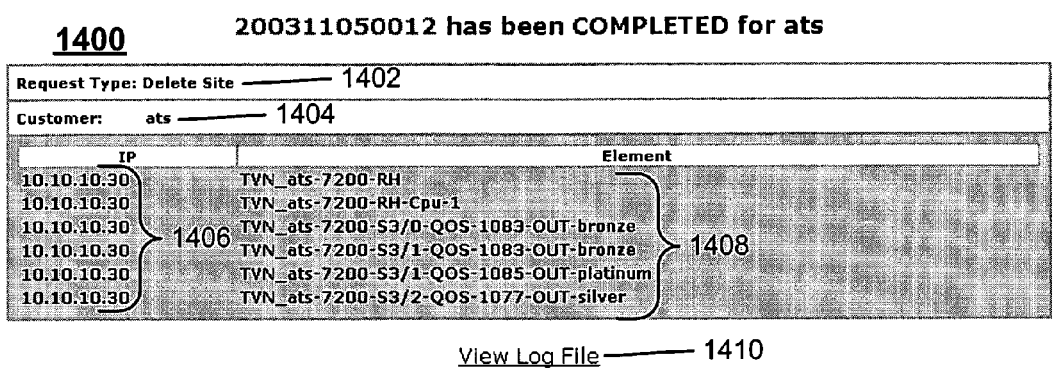

When a request is completed, web server 108 may send an e-mail to the user indicating completion of an associated ticket. The e-mail may have a link, which, when selected by the user, causes web server 108 to send information regarding the ticket to user device 102 for display. FIG. 14 shows exemplary screen 1400, which indicates that ticket 200311050012 has been completed and lists a request type of the action 1402, a customer name 1404 and element name(s) 1408 regarding the completed action. The user may request to view a log file by selecting "View Log File" 1410, which would cause web server 108 to send information from the log file to user device 102 for display to the user.

After selecting "Request Spreadsheet" from a request pull down menu and a customer, such as, for example, ats, from a pull down menu, web server 108 may determine which network management server 114 is to receive the request by accessing customer information database 112, may create ticket 400 for the request, with status 404 set to pending and may set e-mail address 406 to the user's e-mail address. Web server 108 may create a file, such as a DSC file, and may securely send the DSC file, to network management server 114 via a mover process to initiate discovery at network management server 114 of the customer's sites and elements. Network management server 114 may perform the discovery and generate a RES file, which may be sent to web server 108.

Web server 108 may store information from the RES file to a log and may update the ticket status 404 from pending to completed. Web server may then send at least some of the information from the log file to user device 102, such that a display 1500 may be displayed to the user via user device 102. Display 1500 may list elements, IP addresses, input speed and output speed of the customer's managed elements. The user may download a spreadsheet to user device 102 by selecting "Download Spreadsheet" 1502.

FIGS. 5-15 are exemplary screens and may contain additional or fewer fields in other implementations consistent with the principles of the invention. Further, other screens for other requests may also be included or may replace some or all of the screens shown in FIGS. 5-15. In summary, screens shown in FIGS. 5-15 allow various networks and network devices for customers to be managed in an efficient manner. Using the screens, a network management user may manage multiple customer networks via a single user device 102 through secure network connections.

Variations

Variations may be included in implementations consistent with the principles of the invention. For example, the above implementations may notify the user via an e-mail message, which provides the user with a link that can be used to request additional information for display. In some implementations, web server 108 may send information to user device 102 for display without first sending an e-mail to the user. For example, upon receiving information from a discovery request to network management server 114, web server 108 may send the information for display to user device 102 without first sending an e-mail message to the user's e-mail address with a link to the web page having the discovery results.

Further, in some implementations consistent with the principles of the invention, information entered into a user request may be checked for formatting errors. For example, web server 108 may check the format of information included by the user in user requests and may send an error message to user device 102 when the information included in the user request is not of the proper format.

CONCLUSION

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain aspects have been described as implemented in software, other configurations may be possible.

While series of acts have been described with regard to FIG. 3, the order of the acts is not critical. In addition, acts described above as being performed by one device/subsystem may alternatively be performed by another device/subsystem. Further, in still other alternative implementations, a single device/subsystem may perform all of the acts described above as being performed by a number of devices/subsystems. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method for managing networks in a multiple domain environment, the method comprising:
   establishing, by a web server, a first secure session;
   receiving, at the web server, a user request from a user via a first secure session;
   automatically accessing, by the web server, a database to determine a domain pertaining to the user request;
   generating, by the web server, a request based on the user request;
   sending, by the web server, the request to a device associated with the determined domain; and
   sending an e-mail message to the user, the e-mail message including information related to results of the request.

2. The method of claim 1, further comprising:
   receiving identifying information via the first secure session through a network;
   authenticating the user based on the received identifying information; and
   granting access to the authenticated user.

3. The method of claim 2, where the identifying information includes a user ID and a password.

4. The method of claim 2, where the authenticating comprises returning a token indicating a type of access permitted.

5. The method of claim 1, where the user request is a provisioning request.

6. The method of claim 1, further comprising:
   checking a format of information in the user request; and
   sending an error message when the checking determines an error in the format of the information.

7. The method of claim 1, where the receiving a user request via the first secure session comprises:

receiving the user request selected from a menu including a plurality of user requests.

8. The method of claim 7, where the menu is a pull-down menu.

9. The method of claim 1, further comprising:
generating a discovery request to request information regarding sites or elements;
sending the discovery request to the device associated with the determined domain; and
receiving the requested information regarding the sites or the elements.

10. The method of claim 9, further comprising:
receiving additional information from the user; and
sending the request to the device at the determined domain, wherein the generating the request includes at least some of the additional information.

11. The method of claim 1, where the e-mail message further comprises:
a link pointing to a location having the results of the request.

12. The method of claim 1, where the automatically determining a domain pertaining to the user request comprises:
accessing the database via a secure connection through the network.

13. A system for managing networks in multiple domains, the system comprising:
a first server configured to:
receive a user request from a user device of a user via a first secure session over a network,
automatically access a database to determine a domain for the user request,
generate a request based on the user request, send the request to a second server via the network,
receive request results from the second server via the network; and
inform the user that the request is completed by sending an e-mail message to the user.

14. The system of claim 13, further comprising:
a database accessible by the first server, where
the first server is further to access the database to determine a domain pertaining to the user request.

15. The system of claim 13, further comprising:
an authenticator accessible by the first server,
where the first server is further to:
receive identifying information from the user device through the network,
send the identifying information to the authenticator,
receive access authorization information from the authenticator, and
grant access to the user device based on the authorization information.

16. The system of claim 15, where the identifying information includes a user ID and a password.

17. The system of claim 13, where the first server is further to:
check a format of information in the user request, and
send an error message to the user device when the first server finds an error in the format of the information in the user request.

18. The system of claim 13, where the first server is further to:
generate a discovery request to request information regarding sites or elements,
send the discovery request to the second server via a secure connection through the network,
receive the requested information, and
send at least some of the requested information to the user device.

19. The system of claim 18, where the first server is to:
receive additional information from the user device.

20. The system of claim 19, where the first server is further to:
receive the additional information,
where the generated request includes at least some of the additional information.

21. A server for use in a network, the server comprising:
at least one processor; and
a storage device configured to store instructions for the at least one processor, wherein when the at least one processor executes the instructions, the at least one processor is configured to:
receive a user request from a user device of a user,
automatically access a database to determine a domain for the user request,
generate a request based on the user request, send the generated request to a device in the determined domain via a network,
receive results of the request from the device, and
inform the user of the results by sending an e-mail message to the user.

22. The server of claim 21, where the at least one processor is further to:
receive identifying information from the user device via a secure connection,
send the identifying information to an authenticator, and
receive an indication of access from the authenticator.

23. The server of claim 21, where the user request is a provisioning request.

24. The server of claim 21, where the at least one processor is further to:
determine whether information in the user request provided by a user has a correct format, and
sending an error message to the user device when the server determines that the information in the user request provided by the user has an incorrect format.

25. The server of claim 21, where the at least one processor is further to:
generate a discovery request based on the user request,
send the discovery request to the device in the determined domain,
receive results of the discovery request from the device, and
send at least some of the results of the discovery request to the user device.

26. The server of claim 25, where the at least one processor is further to:
receive additional information from the user device,
where the generated request includes at least some of the additional information.

27. A non-transitory machine-readable medium containing instructions for controlling at least one processor to perform a method for managing networks in a multiple domain environment, the method comprising:
receiving a user request from a user device of a user;
automatically accessing a database to determine a domain for the user request;
generating a request based on the user request;
sending the generated request to a device in the determined domain via a network;
receiving results of the request from the device; and
informing the user of the results by sending an e-mail message to the user.

28. The machine-readable memory device of claim 27, where the method further comprises:
    receiving identifying information from the user device,
    sending the identifying information to an authenticator, and
    receiving an indication of granted access from the authenticator.

29. The machine-readable memory device of claim 27, where the method further comprises:
    determining whether information in the user request is of an expected format, and
    sending an error message to the user device when the server determines that the information in the user request provided by the user is not in the expected format.

30. The machine-readable memory device of claim 27, where the method further comprises:
    creating a discovery request based on the user request,
    sending the discovery request to the determined domain,
    receiving results of the discovery request, and
    sending at least some of the results of the discovery request to the user device.

* * * * *